UNITED STATES PATENT OFFICE 2,228,452

PREPARATION OF ESTERS

Anthony H. Gleason, Elizabeth, N. J., assignor to Standard Oil Development Company, a corporation of Delaware No Drawing. Application April 1, 1937,
Serial No. 134,304

11 Claims. (Cl. 260—483)

This invention relates to the preparation of esters and it relates more particularly to the preparation of products of the type of aceto-acetic esters by reaction of polymers of ketenes, especially cyclobutane 1:3 dione which is the dimer of ordinary ketene, with monohydroxy alcohols.

This application is a continuation-in-part of copending application of Peter J. Wiezevich and Anthony H. Gleason, Serial No. 720,946, filed April 17, 1934, now Patent No. 2,103,505, which in turn is a continuation-in-part of the Wiezevich and Gleason application Serial No. 559,936, filed August 28, 1931, now Patent 1,998,404.

In Patent 1,998,404, a method was described for the preparation in high yields of cyclobutane 1:3 dione presumably having the formula

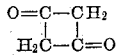

by the polymerization of ketene ($CH_2$:CO) by contacting it with a metallic surface promoting the polymerization of the ketene.

The cyclobutane 1:3 dione (B. Pt. about 127° C.) so prepared may be considered as the anhydride of aceto-acetic acid since it reacts with water to give aceto-acetic acid and under suitable conditions may be made to react with various other compounds. Thus, although the diketene is believed to have the cyclic structure illustrated above, yet in certain respects it acts as if it had the formula $CH_3.CO.CH:CO$. The exact mechanism of the reaction or reactions involved in the conversion of the diketene (cyclobutane 1:3 dione), which has a cyclic structure, into linear type compounds, such as aceto-acetic acid or esters thereof, is not well understood, although it is believed that the cyclic compound is unstable and that in some manner the ring structure breaks and opens up into a linear type compound. It is also unstable in that frequently simple acetates are formed (from the group $CH_3.CO$) instead of aceto-acetates.

The present invention deals with treating this dimer, as well as any other polymerization products of ketene, such as dehydroacetic acid having the formula

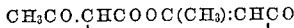

or other higher polymers, under suitable conditions, with monohydroxy alcohols to produce esters. For instance, ethyl alcohol when reacted with diketene forms ethyl aceto-acetate. Other saturated aliphatic monohydroxy alcohols may be used such as methyl, isopropyl, octyl, lauryl, and octadecyl alcohols. Other alcohols which may be used include unsaturated alcohols such as butenyl and oleyl alcohols, aromatic derivatives of aliphatic alcohols, for instance, benzyl alcohol, phenyl ethyl alcohol, etc., and also alcohols having a saturated ring structure such as cyclohexanol and naphthenic alcohols.

According to the present invention, it has been discovered that in spite of the thermal instability of the diketene, high yields of the desired aceto-acetic esters are obtained by carrying out the esterification at slightly elevated temperatures, such as from about 50° C. up to the boiling point of the diketene (127° C.), although the temperature is preferably maintained between the approximate limits of 80 and 100° C. When low-boiling alcohols are used, the reaction is preferably carried out under reflux.

Some other preferred reaction conditions are mentioned briefly herewith. The proportions of reactants should be maintained between the approximate limits of 0.5 and 5 mols of the alcohol to 1 mol of the ketene polymer. With the lower molecular weight alcohols, the proportion should preferably be between about 1 and 2 mols of the alcohol to 1 mol of the ketene polymer, whereas with higher boiling alcohols a ratio of 1:1 is preferably maintained or a slight excess (e. g. 5 or 10%) of the alcohol. The reaction time will, of course, depend to some extent upon the temperature and the concentration of reactants and will normally be about 2 to 3 hours for a temperature of about 80° to 100° C. The reaction should be carried out in the presence of a small amount of esterification catalyst which is preferably an acid such as hydrochloric acid, sulfuric acid, phosphoric acid or di- or trichloracetic acid, the amount to be used ranging from about 0.5 to 3%, or preferably about 1 to 2%, by weight of the total reactants. The reaction is also preferably carried out in the presence of a diluent or solvent such as benzene, toluene, ethylene dichloride, tri- or tetrachlorethane, etc., especially when the ketene polymer is reacted with a higher alcohol. (When lower alcohols are used an excess of the alcohol may serve as diluent.) It is believed that this diluent assists in controlling the reaction in favor of the desired esterification rather than permitting undesirable decomposition or side reactions to take place, such as the breaking up of the aceto-acetic esters to form simple acetates.

In carrying out the invention, the alcohol and the ketene polymer may be mixed in a suitable container and then the catalyst added. Finally, the entire mixture is heated for the required reaction time. If desired, this order of procedure may be varied to some extent as will be understood by those skilled in the art.

Although the invention has been particularly described with reference to and is preferably carried out with diketene or other polymers of acetic ketene, polymers of other ketenes, such as methyl ketene CH₃CHCO, etc., may be used.

The following example is given for the sake of illustration and without intention of limiting the invention to the specific details disclosed:

Example

When diketene was treated with an excess of alcohol and a trace of sulfuric acid, only traces of ester could be found and at the end of 10 days the odor of the dimer from the reaction mixture was still pronounced, thus indicating that only little, if any, esterification had taken place.

Another sample of the diketene (37 g.) was heated under reflux on a steam bath (100° C.) with 40 g. of absolute ethyl alcohol and 0.3 g. of sulfuric acid for 3 hours. In spite of the thermal instability of the polymer, a yield of 80–85% of ethyl aceto-acetate, boiling at 68° C. at 10 mm. pressure was obtained by washing the reaction product with saturated salt solution, drying, filtering, and distilling under vacuum.

The foregoing description is merely illustrative and it is not intended that the invention be limited by any of the theories suggested as to the operation of the invention.

I claim:

1. The method of preparing aceto-acetic esters which comprises reacting a polymer of ketene with a monohydroxy alcohol at a temperature above 50° C. in the presence of a small amount of an acid serving as esterification catalyst.

2. The method of preparing aceto-acetic esters which comprises reacting about 0.5 to about 5.0 mols of a monohydroxy alcohol with 1 mol of diketene at a temperature above 50° C. in the presence of a small amount of an acid serving as esterification catalyst.

3. Method according to claim 2 in which lower aliphatic alcohols are used.

4. The method of preparing ethyl aceto-acetate which comprises heating diketene with an excess of ethyl alcohol to a temperature of about 80 to about 100° C. in the presence of a small amount of sulfuric acid.

5. Method according to claim 4 in which approximately 2 mols of ethyl alcohol are used for each mol of diketene, and the reaction is carried out in the presence of about 1 to about 2% of sulfuric acid based on the total weight of diketene and alcohol.

6. In the process of preparing esters by the reaction of a ketene polymer with a monohydroxy alcohol in the presence of an esterification catalyst, the step of heating the reaction mixture to a temperature above 50° C., but not above the boiling point of the ketene polymer.

7. The process according to claim 6 carried out in the presence of a diluent.

8. The method of preparing ethyl aceto-acetate which comprises heating one molecular proportion of diketene with substantially two molecular proportions of ethyl alcohol at a temperature of about 100° C. in the presence of substantially 0.006 molecular proportions of sulfuric acid.

9. The method of preparing ethyl aceto-acetate which comprises heating one molecular proportion of diketene with substantially two molecular proportions of ethyl alcohol at a temperature of about 100° C. in the presence of substantially 0.006 molecular proportions of sulfuric acid for a period of about three hours.

10. The method of preparing aceto-acetic esters which comprises reacting a polymer of ketene with a monohydroxy alcohol at a temperature of about 80° to about 100° C. in the presence of a small amount of an acid serving as esterification catalyst.

11. The process of preparing aceto-acetic acid esters which comprises reacting diketene with an aliphatic monohydroxy alcohol at a temperature in excess of 50° C., in the presence of an acid esterification catalyst and a liquid diluent.

ANTHONY H. GLEASON.